US006727811B1

(12) United States Patent
Fendis

(10) Patent No.: US 6,727,811 B1
(45) **Date of Patent: *Apr. 27, 2004**

(54) MONITORING SYSTEM

(76) Inventor: Gregory Fendis, PO Box 306, Vermont, Victoria 3133 (AU)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/474,066

(22) Filed: Dec. 29, 1999

(30) Foreign Application Priority Data

Jun. 25, 1999 (AU) .......................................... PQ1220

(51) Int. Cl.[7] .......................... G08B 29/00; H04Q 1/08

(52) U.S. Cl. .................. 340/506; 340/531; 340/539.16; 340/539.17

(58) Field of Search ................................ 340/506, 531, 340/539, 541, 539.1, 539.16, 539.17, 539.18

(56) References Cited

U.S. PATENT DOCUMENTS

| | | | | |
|---|---|---|---|---|
| 5,917,405 A | * 6/1999 | Joao | ........................... | 340/426 |
| 5,987,519 A | * 11/1999 | Peifer et al. | ................ | 709/230 |
| 6,049,353 A | * 4/2000 | Gray | ..................... | 340/825.06 |
| 6,078,649 A | * 6/2000 | Small et al. | .................. | 379/39 |
| 6,271,752 B1 | * 8/2001 | Vaios | ......................... | 340/541 |

FOREIGN PATENT DOCUMENTS

| | | |
|---|---|---|
| GB | 2 325 548 A | 11/1998 |
| JP | 10055291 A | 2/1998 |
| JP | 10164246 A | 6/1998 |
| WO | WO 98/33126 | 7/1998 |

* cited by examiner

*Primary Examiner*—Donnie L. Crosland
(74) *Attorney, Agent, or Firm*—Stites & Harbison PLLC; Douglas E. Jackson

(57) ABSTRACT

A method and system for of monitoring a site, the method including: monitoring the site for the occurrence of predetermined alarm condition; responding to the alarm condition by capturing a packet of alarm data; and transmitting the packet of alarm data to a remote location or to a communications network for transmission to the remote location.

21 Claims, 4 Drawing Sheets

MONITORING SYSTEM

FIELD OF THE INVENTION

The present invention relates to a system for remote monitoring, and for the communication to a user remote from the monitored location. It is of particular but by no means exclusive use in the areas of security monitoring of, for example, sites such as domestic premises, industrial premises or vehicles.

BACKGROUND OF THE INVENTION

Existing remote monitoring or alarm systems are triggered by, for example, a security breach, such as when an intruder triggered a motion detector or other sensor. An alarm condition is thereby established, causing an alarm indication signal, indicating that the alarm condition exists, to be transmitted to a remote monitoring site. The alarm indication signal may then trigger a bell, light or the like at that remote monitoring site. In some systems, a person at that remote site can then inspect the monitored location by means of, for example, closed circuit video system. This person may be employed to monitor several sites in this manner. Alternatively, this person-who may be the owner of the monitored site or vehicle-may be provided with a portable alarm device that can receive a signal from the monitored premises indicative of an alarm situation, so that the portable device can omit an audible tone or alarm to alert that person that an alarm condition exists, and that the monitored site (premises, vehicle, etc.) should be inspected.

SUMMARY OF THE INVENTION

It is an object of the present invention to provide a monitoring system that provides greater information about the alarm condition that has given rise to the alarm.

According to the present invention, therefore, there is provided a monitoring system for monitoring a site including:

- an alarm sensing means for sensing the occurrence for an alarm condition;
- a data collection means for collecting alarm data pertaining to the alarm condition; and
- data transmission means for transmitting said data from said site so that a user can inspect said alarm condition remotely;

wherein said alarm data comprises a discrete data packet.

The data transmission means may be an interface to a communications network such as the internet, or include such a communications network.

Preferably said data packet constitutes or forms a part of an electronic mail message.

Preferably said system includes data storage means for storing said data for later inspection and/or analysis. Preferably said alarm data includes audio and/or video data and may include streaming video.

Preferably said system includes data evaluation means, for evaluating the alarm data and determining whether data should be forwarded to said user and, if so, to which user or users.

Preferably the evaluation means is provided with or operable to obtain a look-up table of data so that said evaluation means may evaluate said alarm data by comparing said alarm data with said look-up table data. The look-up table may be established when said system is initialised.

Thus, the look-up table data may comprise an image of the monitored site, which may be compared with the alarm data (in the form of an image collected following an alarm condition). The evaluation means may be configured so that it does not forward the alarm data if these images do not differ to any significant extent.

Preferably said system is provided with smart card access means for controlling access to said system and/or for controlling the operation of said system.

The present invention also provides a method of monitoring a site including:

- monitoring said site for the occurrence of predetermined alarm condition;
- responding to said alarm condition by capturing a packet of alarm data; and
- transmitting said packet of alarm data to a remote location or to a communications network for transmission to said remote location.

Preferably said method includes evaluating said alarm data, and more preferably evaluating said alarm data against a look-up table of data indicative of a non-alarm condition.

Preferably said alarm data includes streaming audio and/or streaming video data, and more preferably said alarm data is transmitted over a computer network.

Preferably said computer network comprises the internet, and preferably said alarm data is transmitted by means of electronic mail.

BRIEF DESCRIPTION OF THE FIGURES

In order that the present invention may be more clearly ascertained, preferred embodiments will now be described, by way of example, with reference to the accompanying drawings in which.

DETAILED DESCRIPTION OF THE PREFERRED EMBODIMENTS

Figure 1:
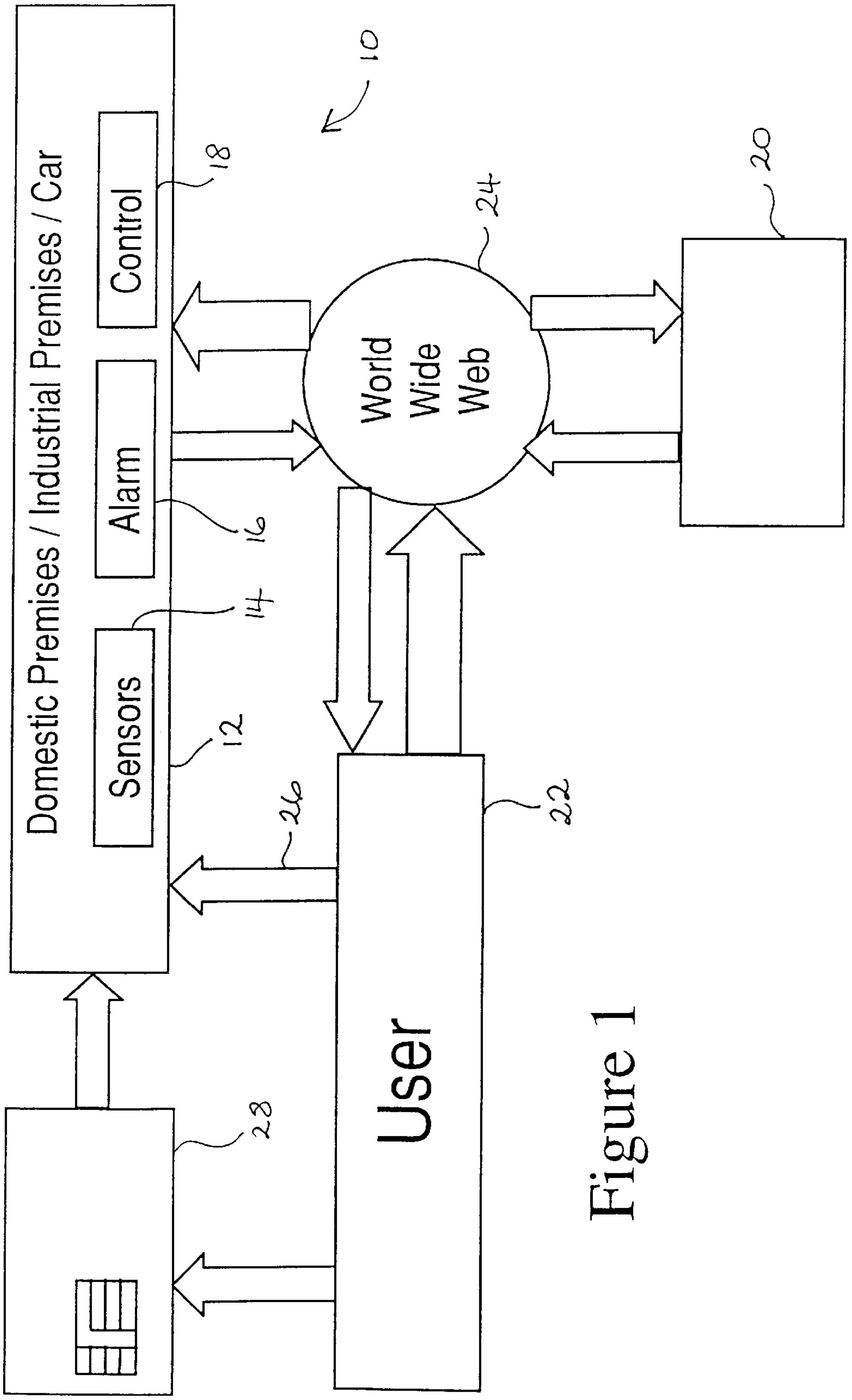
FIG. 1 is a schematic view of a security system according to a preferred embodiment of the present invention.

A security system according to a preferred embodiment of the present invention is illustrated schematically at 10 in FIG. 1. The system 10, for monitoring site 12, includes sensors 14, an alarm 16 and control means 18. Monitored site 12 may be, for example, domestic premises, industrial premises or a vehicle. The system 10 is connectable to the world wide web or internet 24, and operable to send an electronic mail message over the world wide web or internet.

Sensors 14 comprise a motion detector or other such device for detecting a breach of security at site 12 in which, when triggered, establish an alarm condition. The alarm condition activates alarm 16 which, unlike prior art alarms which respond to an alarm condition by emitting an audible and/or visible signal on site and/or remotely, transmits alarm data in the form of streaming video of the area where sensors 14 have detected a breach of security. The alarm data is transmitted over the world wide web or internet 24.

The system 10 further includes a monitoring bureau 20 for receiving an electronic mail message containing this alarm data. Bureau 20 may be automated or manned, and may respond to the receipt of alarm data in a number of different ways. The alarm data may be inspected (either manually or automatically) for relevance and, if the alarm data is found to represent a false alarm, deleted or stored in a suitable data storage means, typically a computer, for later analysis. The bureau 20 may retransmit the alarm data, again by electronic mail, to user 22, also connected to the world wide web or internet 24. The user 22 may then inspect the alarm data and respond as desired. The user can also operate control 18 (either via the world wide web or internet 24), or directly by means of secure land line 26 or other suitable communications means, to disarm or rearm the system 10, control one or more facilities at site 12, or request further data. Where the site 12 comprises industrial premises, the alarm data might represent a response to a failure to some industrial process (such as problems with an assembly line), and user 22 might use control 18 to modify the operation of that process.

Preferably the security system 10 includes or is operable by means of a smart card 28, by means of which user 22 can gain access to site 12 and/or take control of system 10.

Figure 2:
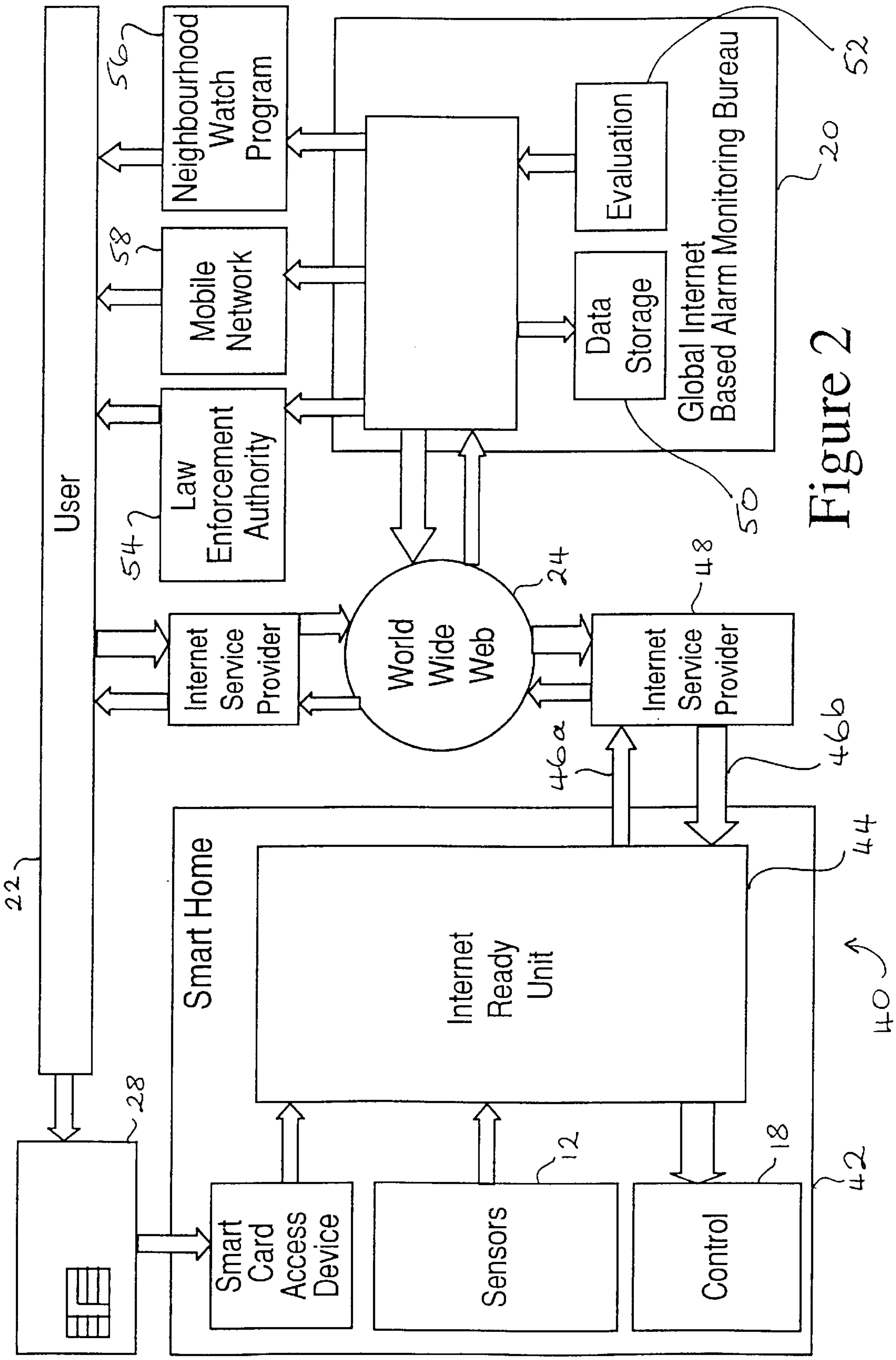
FIG. 2 is an example of a home security system according to the embodiment of FIG. 1.

FIG. 2 illustrates a more particular version of the security system 10 of FIG. 1, comprising a home security system shown schematically at 40. In FIG. 2, like reference numerals are used to indicate like features of FIG. 1.

Home security system 40 includes home base system 42 which, in use, is installed in a home. Home system 42 includes sensors 12 and control 18 as well as an internet ready communications unit 44 (which includes a modem) so that system 42 is connectable via the telephone network 46*a,b* and an internet service provider 48 to the world wide web or internet 24. Monitoring bureau 20 includes data storage means 50 and evaluation means 52. Data storage means 50 comprises a computer on which may be stored alarm data transmitted from system 42 to bureau 20. Evaluation means 52, in this embodiment, comprises a manned station for examining alarm data and deciding, based on that data, whether the alarm data should be forwarded to one or more of a law enforcement authority 54, a neighbourhood watch program 56 and a user 22. Law enforcement authority 54 and neighbourhood watch program 56 may, themselves, also forward such alarm data to user 22. The transmission of the alarm data will generally be by means of electronic mail messages transmitted over the world wide web or internet 24, though alternatively the mobile telephone network 58 may be employed where this network is compatible with the form of the alarm data. For example, where the alarm data constitutes a temperature measured at the monitored site, a short message may be transmitted from bureau 20 to user 22 over the mobile network 58 indicating that an alarm condition has been detected and the particular excessive temperature measured thereafter at the monitored premises.

As in the embodiment of FIG. 1, system 40 is operable by or includes a smart card 28 gaining access to the monitored premises and/or controlling the system 40.

Figure 3:
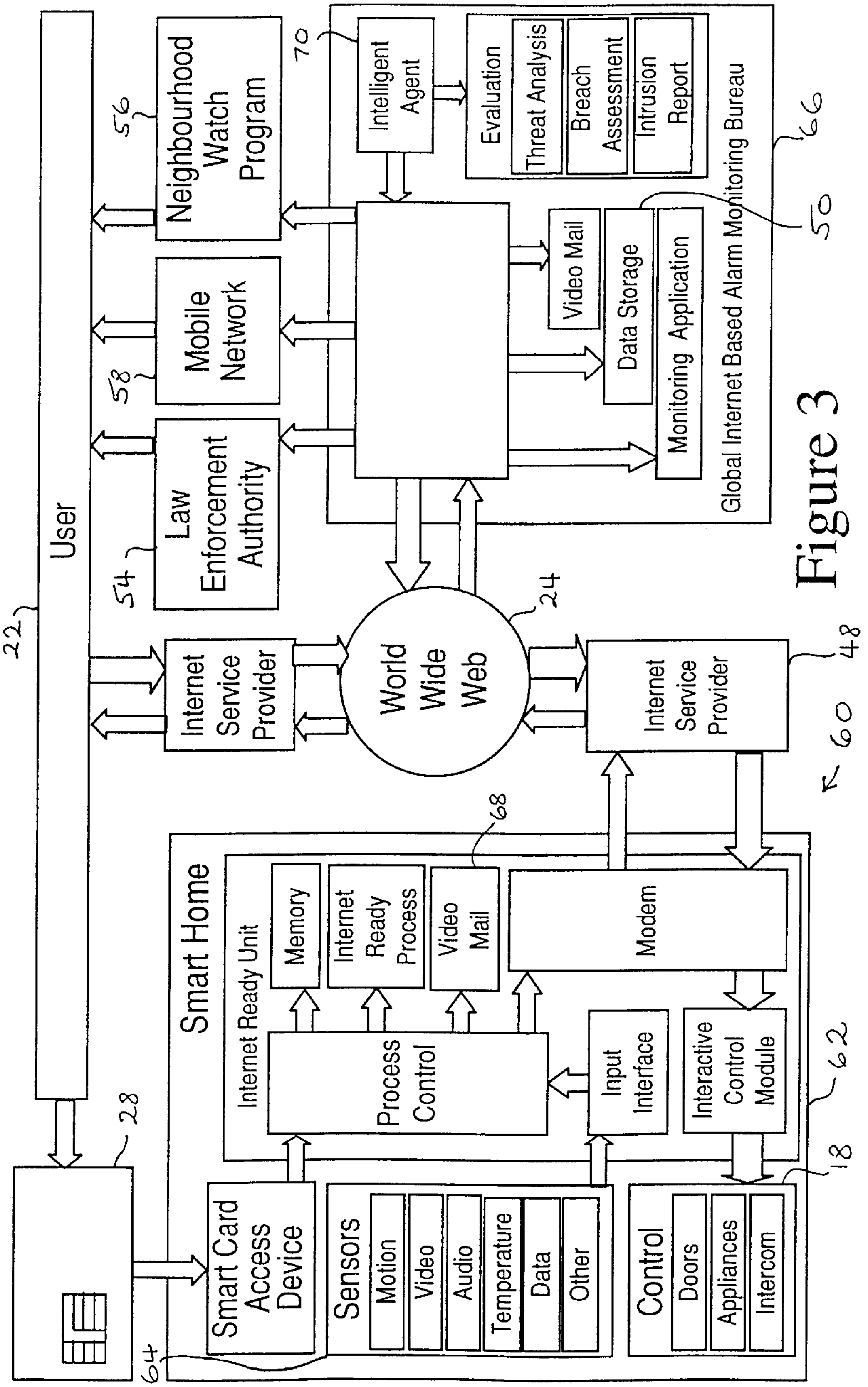
FIG. 3 is a further embodiment of a home security system according to the present invention.

A further preferred embodiment of the present invention is illustrate schematically in FIG. 3, and comprises a more sophisticated home security system 60. Like reference numerals have again been used to indicate like features. System 60 includes home base system 62, which is similar to system 42 of the embodiment of FIG. 3 but shown in greater detail. System 60 may include one or more types of sensors 64 for sensing a security breach, such as motion or temperature detectors. The control module 18 is operable to control the doors of the monitored premises, appliances in the monitored premises, or an intercom so that the user 22 can address or converse with a person at the monitored premises.

As in the embodiments described above, when sensors 64 detect a security breach, alarm data is collected. This may comprise streaming audio and/or streaming video of the monitored premises, the ambient temperature or other data, to be transmitted by electronic mail to monitoring bureau 66 and/or user 22. If the desired alarm data can be collected by sensors 64 (for example, where the sensors are monitoring temperature, and an alarm condition exists when the temperature exceeds a pre-specified threshold), the sensor 64 can also collect this alarm data. If this is not the case, separate alarm data collection means will be included in system 62. For example, a motion sensor may be used to detect a breach of security, but a video camera may by used to collect the alarm data in the form of streaming video. Such alarm data, when transmitted by electronic mail, may be referred to as "video mail" or "v-mail" 68.

Monitoring bureau 66 is similar to monitor bureau 20, but further includes an "intelligent agent" evaluation system 70 for evaluating received alarm data.

Evaluation system 70 is described as "intelligent", as it is operable to perform far more sophisticated evaluation than merely the detection of the presence or absence of alarm data.

Security system 60 is configured so that, when initiated, it obtains from the home system 62 an example of what, in an actual alarm condition, would be transmitted as alarm data. This is stored by monitoring bureau 66 as look-up table base-line data against which future genuine alarm data can be compared by the evaluation system 70. For example, in system 60, alarm data comprises streaming video of the monitored site. At initialisation, a comparable streaming video streaming video is transmitted by electronic mail to monitoring bureau 66 and stored in the look-up table described above. In an alarm condition, alarm data received by monitoring bureau 66 is compared with the data stored in a look-up table by the evaluation system 70. The comparison may comprise, for example, a frame by frame comparison of the two sets of video data, or the comparison of some bulk characteristic of each data set (such as average light intensity etc.). If no difference is detected, to a predefined level of accuracy, evaluation system 70 will deem the alarm condition to be false. Otherwise, it will deem the alarm condition real and issue an intrusion report comprising the alarm data and any other pertinent information (such as date and time), which will be sent by electronic mail as discussed above to one or more of a law enforcement authority 54, a neighbourhood watch program 56 and user 22.

Figure 4:
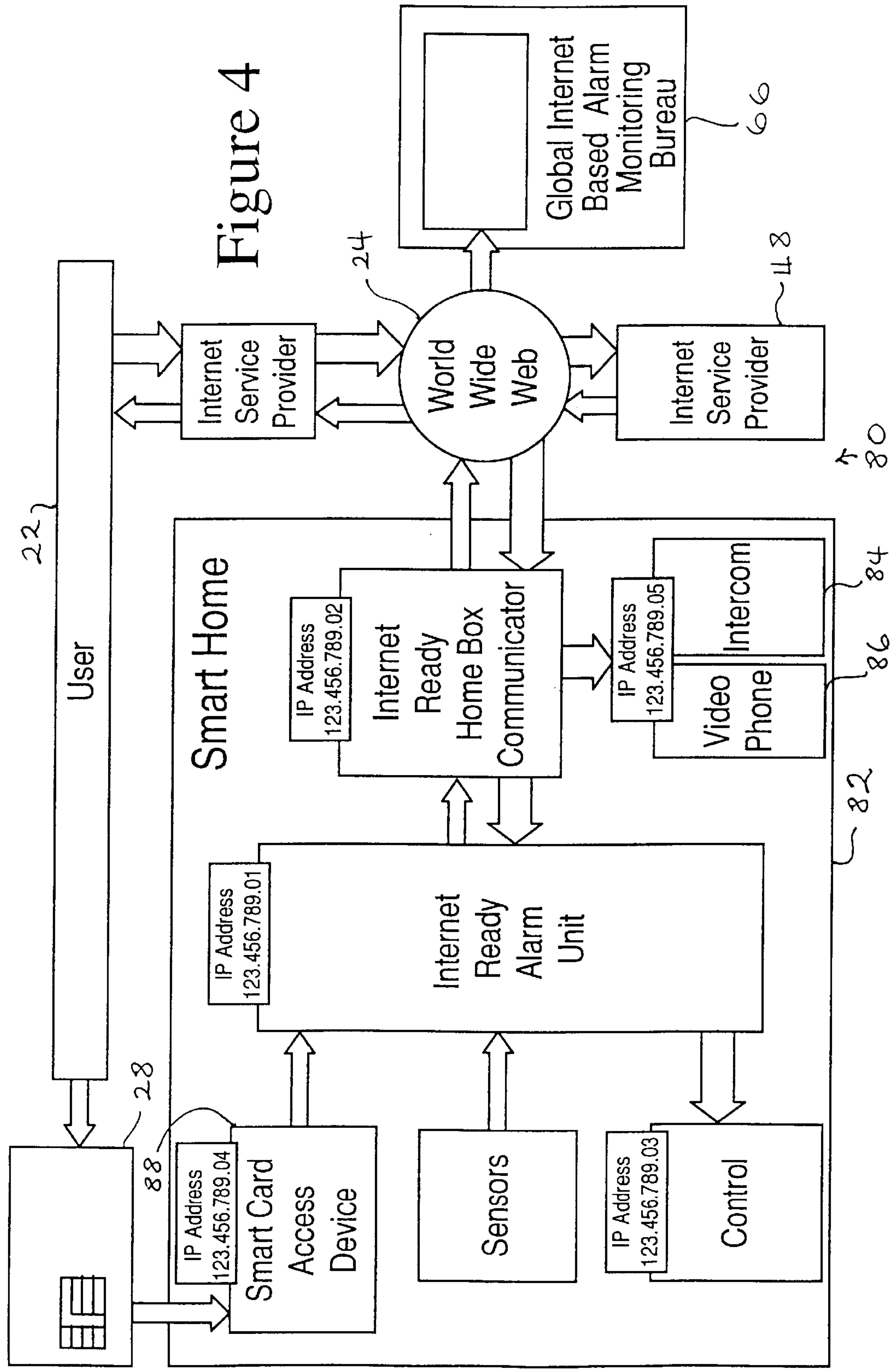
FIG. 4 is a schematic view of yet another preferred embodiment of a home security system according to the present invention.

In a further preferred embodiment (showed schematically in FIG. 4), the monitoring system 80 includes a home security system 82 in which one or more components are directly visible to the internet and have a separate internet protocol address. In this manner, internet service provider 48 is rendered redundant, and user 22 or monitoring bureau 66 can address individual components or system 80 to directly. For example, intercom 84 or video phone 86 can be operated over the internet so that user 22 can converse with a person at the monitored site. Alternatively, smart card access device 88 can be operated by user 22 over the internet, so that the smart card does not have to be entered into a smart card reader at the monitored site, but can rather be entered in a smart card reader remotely and used to access the monitored site or control the system 80 securely from that remote site.

Modifications within the spirit and scope of the invention may readily be effect by persons skilled in the art. For example, reference is made above the systems used with vehicles, but this term should be understood to include land, water and air vehicles as, with mobile and satellite telephony, communications may readily be established (whether by the internet or otherwise) between the various components of the monitoring system. It is to be understood, therefore, that this invention is not limited to the particular embodiments described by way of example hereinabove.

I claim:

1. A monitoring system for monitoring a site, comprising:

an alarm sensor at the site for detecting whether at least one predetermined alarm condition has occurred;

a data collection means at the site for collecting alarm data pertaining to the alarm condition and for outputting said alarm data as a discrete data packet;

data transmission means for transmitting said alarm data from said site; and electronic data evaluation means, at a location remote from said site (a) for receiving said alarm data, and (b) for electronically evaluating said alarm data to determine whether or not said alarm data is indicative of a false alarm condition and, if said electronic data evaluation means determines that said alarm data is not indicative of the false alarm condition, forwarding said alarm data to a user or users.

2. A monitoring system as claimed in claim 1, wherein said data transmission means is an interface to a communications network or includes a communications network.

3. A monitoring system as claimed in claim 2, wherein said communications network is the internet.

4. A monitoring system as claimed in claim 1, wherein said data packet constitutes or forms a part of an electronic mail message.

5. A monitoring system as claimed in claim 1, further including a data storage means for storing said alarm data for later inspection and/or analysis.

6. A monitoring system as claimed in claim 1, wherein said alarm data includes audio and/or video data.

7. A monitoring system as claimed in claim 1, wherein said alarm data includes streaming video.

8. A monitoring system as claimed in claim 1, wherein said data evaluation means is located at a monitoring bureau and said data evaluation means is configured to respond to said alarm condition, if said electronic data evaluation means determines that said alarm data is not indicative of the false alarm condition, by transmitting said alarm data to said user.

9. A monitoring system as claimed in claim 1, wherein the evaluation means is provided with or operable to obtain a look-up table of data so that said evaluation means may evaluate said alarm data by comparing said alarm data with said look-up table data.

10. A monitoring system as claimed in claim 9, wherein said system is configured or operable to establish said look-up table when said system is initialised.

11. A monitoring system as claimed in claim 9, wherein said look-up table data comprises an image of the monitored site, for comparing with the alarm data.

12. A monitoring system as claimed in claim 11, wherein said evaluation means is configured so that it does not forward the alarm data if said image and said alarm data do not differ to a significant extent.

13. A monitoring system as claimed in claim 1, wherein said system is provided with smart card access means for controlling access to said system and/or for controlling the operation of said system.

14. A monitoring system as claimed in claim 1, wherein said data evaluation means comprises an intelligent agent evaluation system for evaluating said alarm data.

15. A method of monitoring a site, including the steps of:

monitoring said site for the occurrence of at least one predetermined alarm condition;

responding to said alarm condition by capturing at the site a packet of alarm data pertaining to the alarm condition;

forwarding the packet of alarm data to a location which is remote from said site;

electronically receiving and evaluating at the location said packet of alarm data to determine whether or not said packet of alarm data is indicative of a false alarm condition and, forwarding; and transmitting, if said alarm data is not indicative of the false alarm condition, said packet of alarm data to a user or users.

16. A method as claimed in claim 15, including evaluating said alarm data against a look-up table of data indicative of a false alarm condition.

17. A method as claimed in claim 15, wherein said alarm data includes streaming audio and/or streaming video data.

18. A method as claimed in claim 15, wherein said alarm data is transmitted over a computer network.

19. A method as claimed in claim 18, wherein said computer network comprises the internet.

20. A method as claimed in claim 19, wherein said alarm data is transmitted by means of electronic mail.

21. A method as claimed in claim 15, including evaluating said alarm data with an intelligent agent evaluation system.

* * * * *

UNITED STATES PATENT AND TRADEMARK OFFICE

CERTIFICATE OF CORRECTION

PATENT NO. : 6,727,811 B1
APPLICATION NO. : 09/474066
DATED : April 27, 2004
INVENTOR(S) : Gregory Fendis It is certified that error appears in the above-identified patent and that said Letters Patent is hereby corrected as shown below:

In the Claims
In Column 6, line 32 of Claim 15, delete the words "and, forwarding"

Signed and Sealed this
Eleventh Day of February, 2014

Michelle K. Lee

Michelle K. Lee
*Deputy Director of the United States Patent and Trademark Office*